United States Patent
Elliott et al.

(10) Patent No.: US 10,039,015 B2
(45) Date of Patent: *Jul. 31, 2018

(54) METHOD AND APPARATUS FOR MONITORING AND ADJUSTING MULTIPLE COMMUNICATION SERVICES AT A VENUE

(71) Applicant: AT&T INTELLECTUAL PROPERTY I, L.P., Atlanta, GA (US)

(72) Inventors: Shane Michael Elliott, Fort Worth, TX (US); Mehul Gandhi, Pune (IN); Ryan Tidwell, Elk Grove, CA (US); Sreekanth Bolloju, Irving, TX (US); Ravindra Dravid, Maharashtra (IN); Shoubha Chakrabarty, Irving, TX (US); Amol Kaveeshwar, Farmers Branch, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,399

(22) Filed: Apr. 20, 2017

(65) Prior Publication Data

US 2017/0223556 A1 Aug. 3, 2017

Related U.S. Application Data

(63) Continuation of application No. 15/131,132, filed on Apr. 18, 2016, now Pat. No. 9,668,151, which is a (Continued)

(51) Int. Cl.
*H04W 24/02* (2009.01)
*H04L 12/26* (2006.01)
(Continued)

(52) U.S. Cl.
CPC ............ *H04W 24/02* (2013.01); *H04L 43/12* (2013.01); *H04L 43/16* (2013.01);
(Continued)

(58) Field of Classification Search
None
See application file for complete search history.

(56) References Cited

U.S. PATENT DOCUMENTS 724,045 A 3/1903 Rogers
5,799,154 A 8/1998 Kuriyan
(Continued)

FOREIGN PATENT DOCUMENTS

WO 2002071780 9/2002

OTHER PUBLICATIONS

Balakrishnan, Hari et al., "Improving reliable transport and handoff performance in cellular wireless networks.", Wireless Networks 1.4, 1995, 469-481. http://www.ece.gatech.edu/research/labs/bwn/ee6610/supplements/snoop.pdf.
(Continued)

*Primary Examiner* — Hong Cho
(74) *Attorney, Agent, or Firm* — Guntin & Gust, PLC; Joseph Hrutka

(57) ABSTRACT

Aspects of the subject disclosure may include, for example, initiating first and second groups of communication sessions according to testing criteria where the first group of communication sessions is established via a local area wireless access technology utilizing the distributed antenna system and the second group of communication sessions is established via the second radio access technology utilizing the distributed antenna system, and measuring performance data for the first and second groups of communication sessions according to the testing criteria. Other embodiments are disclosed.

20 Claims, 8 Drawing Sheets

Related U.S. Application Data continuation of application No. 14/319,110, filed on Jun. 30, 2014, now Pat. No. 9,351,182.

(51) Int. Cl.
| | | |
|---|---|---|
| *H04L 29/12* | (2006.01) | |
| *H04W 24/04* | (2009.01) | |
| *H04W 76/02* | (2009.01) | |
| *H04W 76/15* | (2018.01) | |
| *H04W 84/04* | (2009.01) | |
| *H04W 84/12* | (2009.01) | |

(52) U.S. Cl.
CPC ......... *H04L 61/2007* (2013.01); *H04W 24/04* (2013.01); *H04W 76/025* (2013.01); *H04W 76/15* (2018.02); *H04W 84/042* (2013.01); *H04W 84/12* (2013.01)

(56) References Cited

U.S. PATENT DOCUMENTS

| | | | |
|---|---|---|---|
| 5,917,808 A | 6/1999 | Kosbab | |
| 5,987,306 A | 11/1999 | Nilsen et al. | |
| 6,442,507 B1 | 8/2002 | Skidmore et al. | |
| 6,499,006 B1 | 12/2002 | Rappaport et al. | |
| 6,625,135 B1 | 9/2003 | Johnson et al. | |
| 6,754,470 B2 | 6/2004 | Hendrickson et al. | |
| 6,763,380 B1 * | 7/2004 | Mayton | H04L 41/14 709/223 |
| 6,928,280 B1 | 8/2005 | Xanthos et al. | |
| 7,248,868 B2 | 7/2007 | Snyder et al. | |
| 7,295,960 B2 | 11/2007 | Rappaport et al. | |
| 7,319,847 B2 | 1/2008 | Xanthos et al. | |
| 7,555,306 B2 | 6/2009 | Liu | |
| 7,630,327 B2 | 12/2009 | Arpee | |
| 8,014,726 B1 | 9/2011 | Petersen et al. | |
| 8,254,848 B1 * | 8/2012 | Elliott | H04B 7/022 370/242 |
| 8,364,742 B2 | 1/2013 | Citrano, III | |
| 8,494,452 B2 | 7/2013 | Fok et al. | |
| 8,503,336 B2 | 8/2013 | Rappaport et al. | |
| 8,619,596 B2 | 12/2013 | Wiley et al. | |
| 8,971,816 B2 * | 3/2015 | Hakansson | H01Q 1/1257 455/575.7 |
| 9,118,599 B2 * | 8/2015 | Jones | H04L 43/50 |
| 2005/0163047 A1 | 7/2005 | McGregor et al. | |
| 2006/0217116 A1 | 9/2006 | Cassett et al. | |
| 2007/0087696 A1 * | 4/2007 | D. Bonta | H04L 43/00 455/67.11 |
| 2007/0294686 A1 * | 12/2007 | Oh | G06F 8/68 717/168 |
| 2013/0150065 A1 * | 6/2013 | Elliott | H04B 7/022 455/452.1 |
| 2014/0011496 A1 * | 1/2014 | Elliott | H04B 7/022 455/424 |
| 2016/0234705 A1 | 8/2016 | Elliott | |

OTHER PUBLICATIONS

Chalmers, Dan et al., "A survey of quality of service in mobile computing environments.", Communications Surveys & Tutorials, IEEE 2.2, 1999, 2-10.

Drane, Christopher et al., "Positioning GSM telephones", Communications Magazine, IEEE 36.4, 1998, 46-54.

Lee, Whay et al., "Routing subject to quality of service constraints in integrated communication networks.", Network, IEEE 9.4, 1995, 46-55.

Stuckmann, P. et al., "The EUREKA Gandalf project: monitoring and self-tuning techniques for heterogeneous radio access networks", Vehicular Technology Conference, VTC 2005—Spring, vol. 4, IEEE, 2005.

\* cited by examiner

| Test Case Name | Description | Parameters Captured |
|---|---|---|
| Voice Test | Voice test thread dials a number waits for it to connect to the dialed number, measures the time taken to connect and terminates the voice call | Time to connect (secs.) |
| SMS Test | SMS test thread sends either a short, medium or long character text of 1's to an SMSC server, and measures the time taken to send the SMS out of the modem. Wait for the SMSC to reply to the sent SMS, once a reply SMS is received measures the round trip time | Time to send SMS (ms) SMS Round trip time (secs) |
| Ping Test | Ping test thread calculates the average ping response time. It send's ICMP packets of 32 bytes each 10 times and calculates the response time average | Ping Response time (ms) |
| Facebook Test | Facebook test thread creates a test user account on Facebook and uploads an image. And calculates the time taken to upload the image | Photo upload time (secs) Photo size (mb) |
| DNS Resolve Test | DNS resolve test thread resolves the IP address of a set of URL's and measures the time taken to resolve the IP of URL in milliseconds | DNS resolve time (ms) |
| HTTP Download Throughput Test | HTTP Throughput test thread works on the bandwidth saturation concept used by Speedtest.net. In this test 4 parallel threads are used to download for a specific time period. Then received bytes are sampled and download throughput is measured | Download throughput (kbps) HTTPDownloadParallelThreads HTTPServerIPAddress HTTPServerDownloadURL RadioIPAddress HTTPServerLatency RXBytes LocationProvided |
| HTTP Download Goodput Test | HTTP Goodput test downloads a single file from a test server and measures the download speed in KBPS | Download speed (kbps) HTTPDownloadParallelThreads HTTPServerIPAddress HTTPServerDownloadURL RadioIPAddress HTTPServerLatency RXBytes LocationProvided |
| FTP Download Goodput Test | FTP download test thread downloads a single file from a test server using ftp protocol and measures the download speed in KBPS | Download speed (kbps) FTPServerIPAddress FTPServerDownloadURL RadioIPAddress FTPServerLatency RXBytes LocationProvided |
| FTP Upload Goodput Test | FTP upload test thread uploads a single file to a test server using ftp protocol and measures the upload speed in KBPS | Upload speed (kbps) FTPServerIPAddress FTPServerDownloadURL RadioIPAddress FTPServerLatency RXBytes LocationProvided |

METHOD AND APPARATUS FOR MONITORING AND ADJUSTING MULTIPLE COMMUNICATION SERVICES AT A VENUE

CROSS-REFERENCE TO RELATED APPLICATIONS

This application is a Continuation of and claims priority to U.S. patent application Ser. No. 15/131,132, now U.S. Patent Pub. No. 2016/0234705, which is a Continuation of and claims priority to U.S. patent application Ser. No. 14/319,110, filed Jun. 30, 2014, now U.S. Pat. No. 9,351, 182. The contents of each of the foregoing are hereby incorporated by reference in their entirety.

FIELD OF THE DISCLOSURE

The subject disclosure relates to a method and apparatus for monitoring and adjusting multiple communication services at a venue.

BACKGROUND

Venues, such as stadiums, arenas and so forth, often have a large number of users accessing communication services at the same time. This can create stress on the communications network, which may not only affect the users at the venue, but can also affect users outside of the venue. Service providers can attempt to alleviate the stress on the communications network, but this can be difficult given the number of different services being utilized and the large number of users that are being affected.

BRIEF DESCRIPTION OF THE DRAWINGS

Reference will now be made to the accompanying drawings, which are not necessarily drawn to scale, and wherein:

FIG. 7 depicts an illustrative embodiment of test cases that can be utilized by a probe device that can be used in system 100 of FIG. 1;

DETAILED DESCRIPTION

Figure 1:
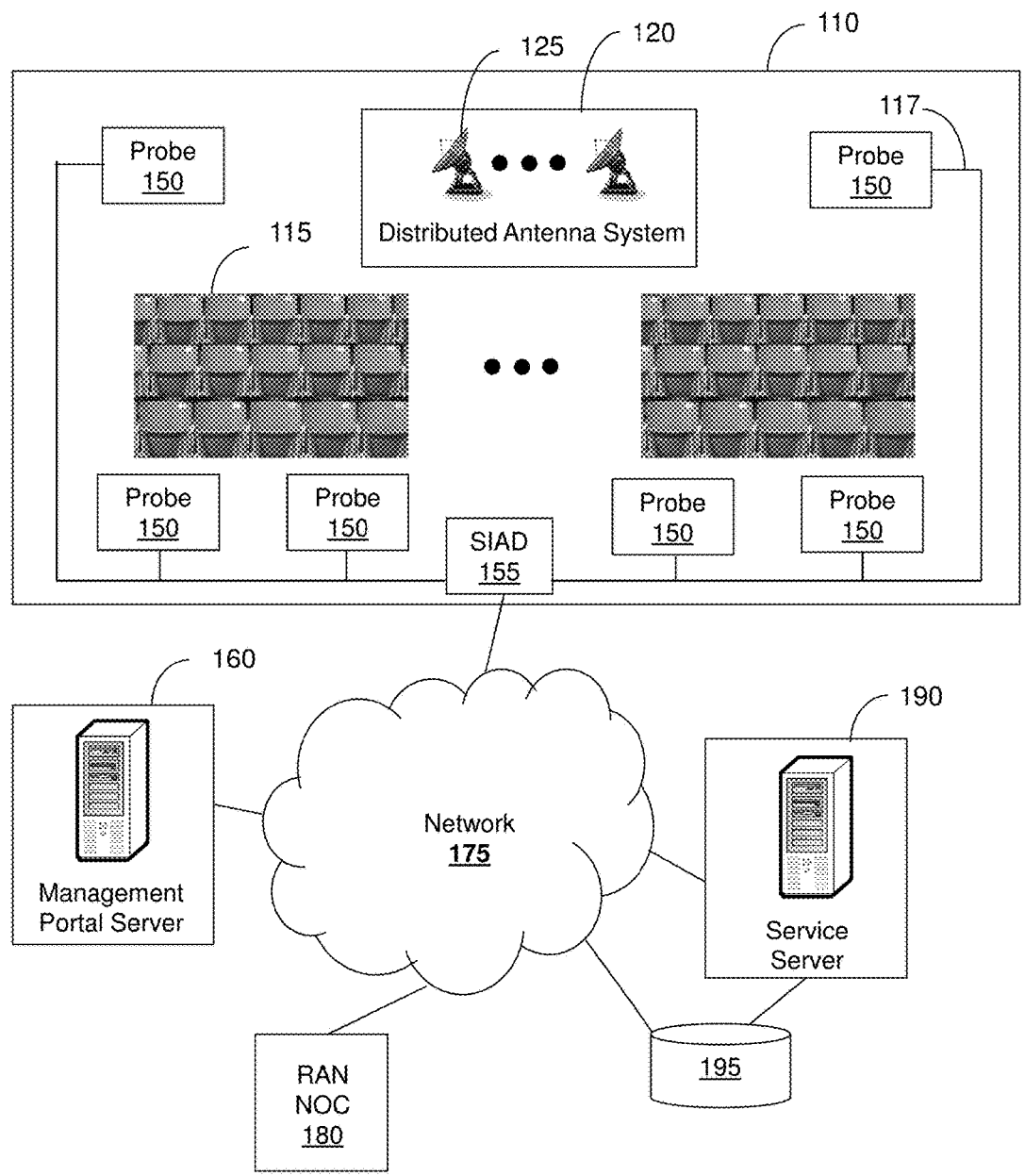
FIG. 1 depicts an illustrative embodiment of a communication system that enables monitoring, evaluating and/or adjusting communication services at a venue.

The subject disclosure describes, among other things, illustrative embodiments for a probe device(s) for measuring and communicating performance test results of communication services provided by a venue Distributed Antenna System (DAS) cellular network and/or local area wireless networks (e.g., WiFi) to one or more service servers. Adjustments to the DAS and/or network parameters for a network providing services to the venue can be made based on the performance test results. The probe device(s) can be in communication with a management portal server(s) for receiving various information including testing criteria (e.g., test suites that indicate one or more of types of data to obtain, types of tests to perform, types of communication services to test, testing schedules, and so forth), software updates, recover commands to assist other probe devices following a failure of the other probe device, and so forth.

In one or more embodiments, the probe device can measure the performance of wireless networks in near real-time, and in a non-intrusive manner so that the testing itself does not degrade the system performance. The probe device is flexible enough to work with multiple forms of radio technology including cellular as well as 802.11 networks, and allows for the use of different types of antennas. The probe device can operate in either indoor or outdoor environments and is cost effective.

In one or more embodiments, the probe device is a small, low power, Advanced Reduced Instruction Set Computer (RISC) Machine (ARM) microprocessor based unit that functions as a wireless probe. The probe device can include a weather-resistant enclosure configured for wall or pole mounting, such as in exposed environments. The probe device can include a hardwire interface for an Ethernet link and/or receiving power over its Ethernet link, such as via a Power Over Ethernet (PoE) mechanism (e.g., IEEE 802.3af compliant device). For instance, the Ethernet interface can be a single interface of the probe device that can receive power (e.g., via a PoE methods and components), can receive command signals from a remote device (e.g. a management portal server) enabling management of the probe device 150, and can provide test data to a remote device (e.g., a database).

In one or more embodiments, the probe device via communication with one or more other devices (e.g., the service server, a management portal server, a database server, and so forth) can provide measurable quality of service statistics through monitoring of multiple wireless services (e.g., Long Term Evolution (LTE), Universal Mobile Telecommunications (UMTS), Global System for Mobile (GSM), Global Position System (GPS), WiFi, World interoperability for Microwave (WiMAX), and others) during events at venues (e.g., football or basketball game) to ensure that the DAS is functioning correctly to support end user devices, where voice calls, text messaging with attachments, photos, videos, or social media sites may be updated by large numbers of users simultaneously during the event.

In one or more embodiments, the probe device can perform a series of automated tests on a user-specified schedule by initiating voice calls, sending and receiving Short Message Service (SMS) and Multimedia Messaging Service (MMS) messages, and performing Hypertext Transfer Protocol (HTTP) and/or File Transfer Protocol (FTP) uploads and downloads through the DAS network at the venue. This test data can be used, such as by the probe device and/or by a network server, to map system performance to specific areas of the venue.

In one or more embodiments, a system can utilize a group of the probe devices at a venue to obtain test results for various communication services provided at the venue. Based on the test results, utilization of network resources and/or network performance can be evaluated and various parameters of the DAS network and/or macro cell(s) can be adjusted to provide improved network performance and a better user experience in the coverage area provided by the DAS network.

Other embodiments are described in the subject disclosure. Other embodiments that can be used in whole or in part with the embodiments described herein are described in co-pending U.S. Patent Application entitled "A Method and Apparatus for Managing Wireless Probe Devices" which has attorney docket number 2013-1286_7785-1065, the disclosure of which is incorporated herein by reference in its entirety.

One embodiment of the subject disclosure includes a probe device having a first wireless interface that enables communications via a first local area wireless access technology, a second wireless interface that enables communications via a second radio access technology, a processor coupled with the first and second wireless interfaces, and a memory that stores executable instructions. The processor, when executing the executable instructions, performs operation including receiving testing criteria from a management portal server. The processor can initiate first and second groups of communication sessions according to the testing criteria, where the first group of communication sessions is established via the local area wireless access technology utilizing a distributed antenna system, and where the second group of communication sessions is established via the second radio access technology utilizing the distributed antenna system. The processor can measure performance data for the first and second groups of communication sessions according to the testing criteria.

One embodiment of the subject disclosure is a method including receiving, by a system including a processor, performance data from a probe device, where the performance data is for first and second groups of communication sessions initiated by the probe device, where the performance data is measured according to testing criteria, where the first group of communication sessions is established via a local area wireless access technology utilizing a distributed antenna system, and where the second group of communication sessions is established via a second radio access technology utilizing the distributed antenna system. The method can include analyzing, by the system, the performance data. The method can include adjusting, by the system, the distributed antenna system, a network providing communication services to a location where the probe device is positioned, or a combination thereof. The adjusting can be based on the analyzing of the performance data.

One embodiment of the subject disclosure includes a machine-readable storage medium, having executable instructions that, when executed by a processor of a probe device, facilitate performance of operations, including initiating, by a first wireless interface of the probe device, a first group of communication sessions according to testing criteria, where the first group of communication sessions is established via a local area wireless access technology utilizing a distributed antenna system. The processor can initiate, by a second wireless interface of the probe device, a second group of communication sessions according to the testing criteria, where the second group of communication sessions is established via a second radio access technology utilizing the distributed antenna system. The processor can establish a first thread for the first wireless interface and a second thread for the second wireless interface. The processor can measure first performance data for the first group of communication sessions according to the testing criteria utilizing the first thread. The processor can measure second performance data for the second group of communication sessions according to the testing criteria utilizing the second thread. The processor can provide the first and second performance data to a network server to enable adjustment of the distributed antenna system, adjustment of a network providing communication services to a location where the probe device is positioned, or a combination thereof.

FIG. 1 depicts an illustrative embodiment of system 100 that enables monitoring, evaluating and/or adjusting communication services at a venue 110 that includes various areas (e.g., seating areas, concession areas, walkways, and so forth) where users can access communication services using end user devices (not shown), such as mobile smart phones, laptop computers, Personal Digital Assistants (PDAs) or other devices capable of wireless communications. The venue 110 can be various types of venues including a stadium, an area, a building, and so forth. In this example, the venue 110 has a DAS 120 with a group of antennas 125 to facilitate communications in the venue. The DAS 120 can be an indoor deployed system (iDAS) and/or an outdoor deployed system (oDAS). The DAS 120 can utilize various components (in various configurations) and/or various techniques for spatially separating antenna nodes with respect to the venue 110, including passive splitters and/or feeders, and/or active-repeater amplifiers to overcome feeder losses. In one or more embodiments, delays may be introduced between antenna elements to artificially increase delay spread in areas of overlapped coverage, permitting quality improvements via time diversity.

System 100 can include a group of probe devices 150 that are positioned at various areas of the venue for monitoring communication services accessible in these areas. System 100 can also include a management portal server 160, a network 175 (e.g., a Radio Access Network (RAN) including a Network Operations Center (RAN NOC) 180), a service server 190, and a database server 195 (e.g., an SQL database server). In one or more embodiments, the probe device 150 can communicate with the management portal server and/or the service server 190 via a hardwire interface (e.g., interface 117) through use of routers and a site switch such as a Smart Integrated Access Device (SIAD) 155. For instance, interface 117 can be used as a command interface that enables remote management or control over the probe device 150, such as through receiving command signals from a remote device (e.g., the management portal server 160). In another embodiment, the interface 117 can also be utilized for providing power to the probe device 150. The probe device 150 can perform a series of automated tests, such as according to a user specified schedule, by initiating voice calls, sending and receiving SMS and MMS messages, and/or performing HTTP and/or FTP uploads and/or downloads through the DAS 120 in order to enable mapping (e.g., by the probe devices 150, by the management portal server 160 and/or by the service server 190) of system performance to specific areas of the venue 110.

Figure 2:
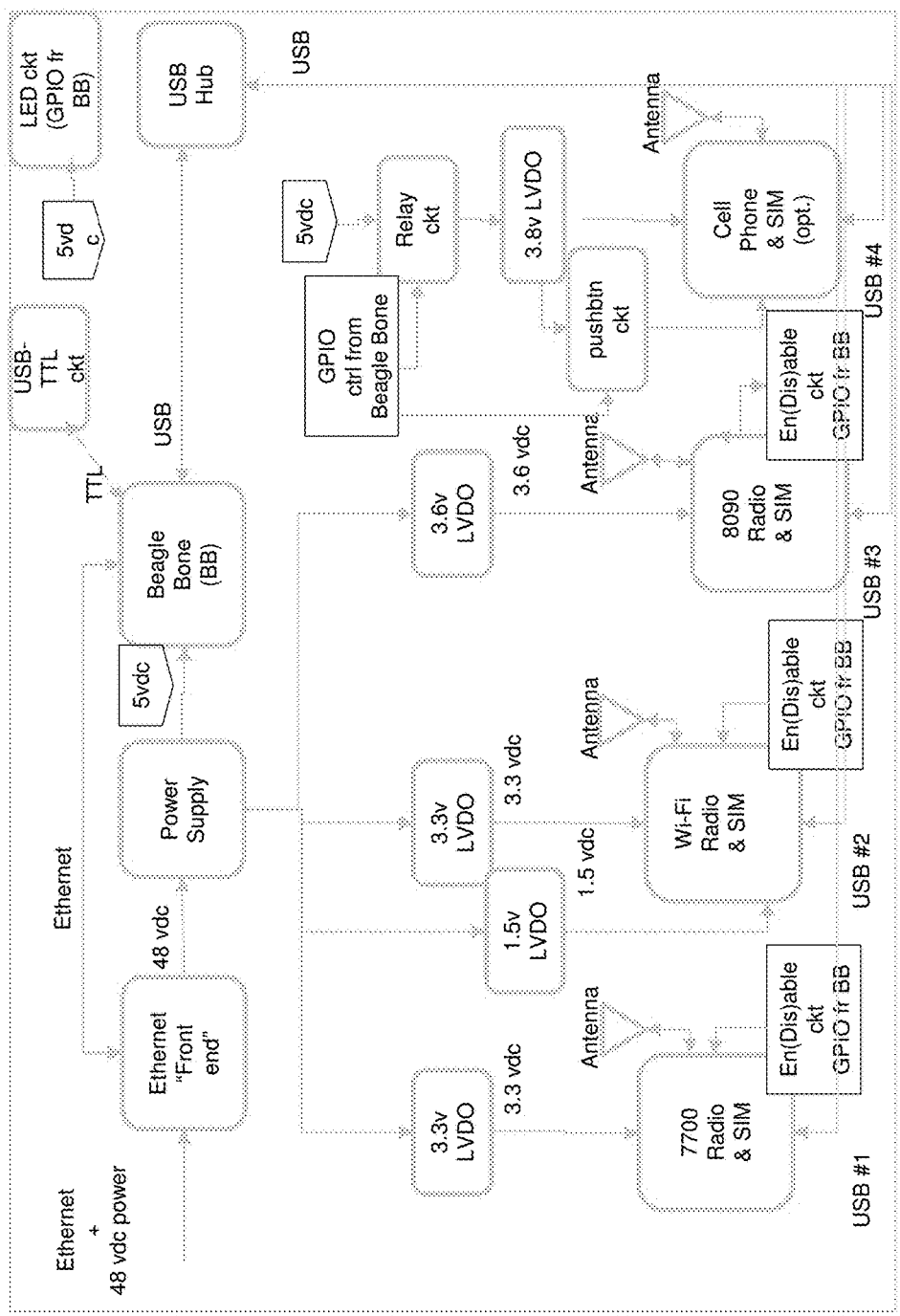
FIGS. 2 and 3 depict illustrative embodiments of block diagrams representing probe devices that can be used in system 100 of FIG. 1.

In one or more embodiments, the probe devices 150 can be mounted or otherwise affixed to infrastructure of the venue, such as a wall or ceiling, or can be positioned on a pole at a height that prevents tampering or otherwise contact with persons. As an example and referring additionally to FIG. 2, the probe device 150 can be a small integrated unit based on an ARM-family processor and associated peripherals, which supports Mini-PCIe compliant plugin cellular modems, and a Mini-PCIe 802.11 WiFi modem. Other types of modems that operate utilizing other access technology can also be utilized in addition to, or in place of, the modems of FIG. 2. The combination of small size, low power, and flexibility of communications types and bands (e.g., UMTS, GSM, LTE, GPS, and/or WiFi) can enable the probe device 150 to efficiently perform Quality of Service (QoS) testing for mobile communication services. The probe device 150 can support new or emerging technologies via software updates and/or component updates (e.g., modular components that are removable from the probe device 150).

In one or more embodiments, all of the onboard communication of the probe device 150 between the control module and the various modems can be performed through interconnection of the internal mini-PCIe cellular modems via USB 2.0 standard interfaces and a multi-port USB hub. In one or more embodiments, the probe device 150 can support integration of a commercially available mobile handset (e.g., an Android handset) to provide additional testing capability. In one embodiment, the probe device 150 can include a single external hardwire connection or interface, which can provide an Ethernet interface to the service server 190 and/or power via PoE circuitry. In one embodiment, the enclosure or housing can satisfy Telcordia requirements for weather, temperature, dust intrusion, and so forth for enclosures, and can provide industry standard antenna connections for maximum flexibility in antenna selection.

In one embodiment, the probe device 150 can provide a visual indicator, such as a single, externally-visible LED, that flashes or otherwise emits an indication in a specified manner to represent operations of the probe device, such as each time that power is applied after a period without power (e.g., the LED can remain On when the probe device is booting); a short flash when the IP address is enabled; exhibit a long flash when the operating system is loading and turn Off when the probe device has been registered with the service server 190 and/or the management portal server 160). These LED or other visual indications can be visible at the time of installation to enable a determination that the probe device 150 is functioning before the installation is completed.

The probe device 150 can operate using various operating systems, such as a Linux™ operating system, to provide for flexibility and software compatibility. The probe device 150 can accept external commands, such as from the management portal server 160 (e.g., via interface 117), for functions including starting and stopping the software, rebooting, reporting status and/or enabling the management portal server to remotely initiate an upgrade to the software without a service call. The software of the probe device 150 can accept Advanced Technology (AT) commands through the diagnostic/maintenance port for administrative or troubleshooting purposes. In one embodiment, a portal operator via the management portal server 160 can upload new or unique test suites to each probe device 150 at the venue 110, such as based upon the features and function that needs to be tested.

Figure 3:
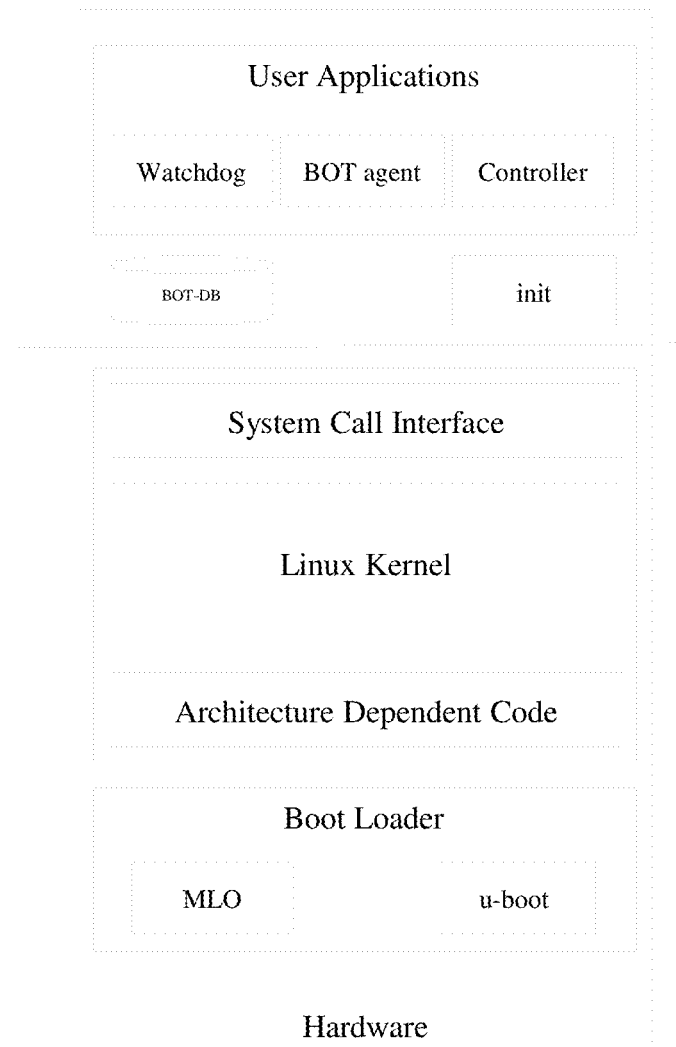

Referring additionally to FIG. 3, the functionality of the probe device 150 is generally illustrated. The probe device software enables administration, testing, and/or reporting of the status of the probe device itself and the results of the network testing to the service server 190 and the database server 195. The software can also listen for commands from the management portal server 160 that may change the status and/or test regimen of the probe device as it runs on the probe device platform.

Figure 4:
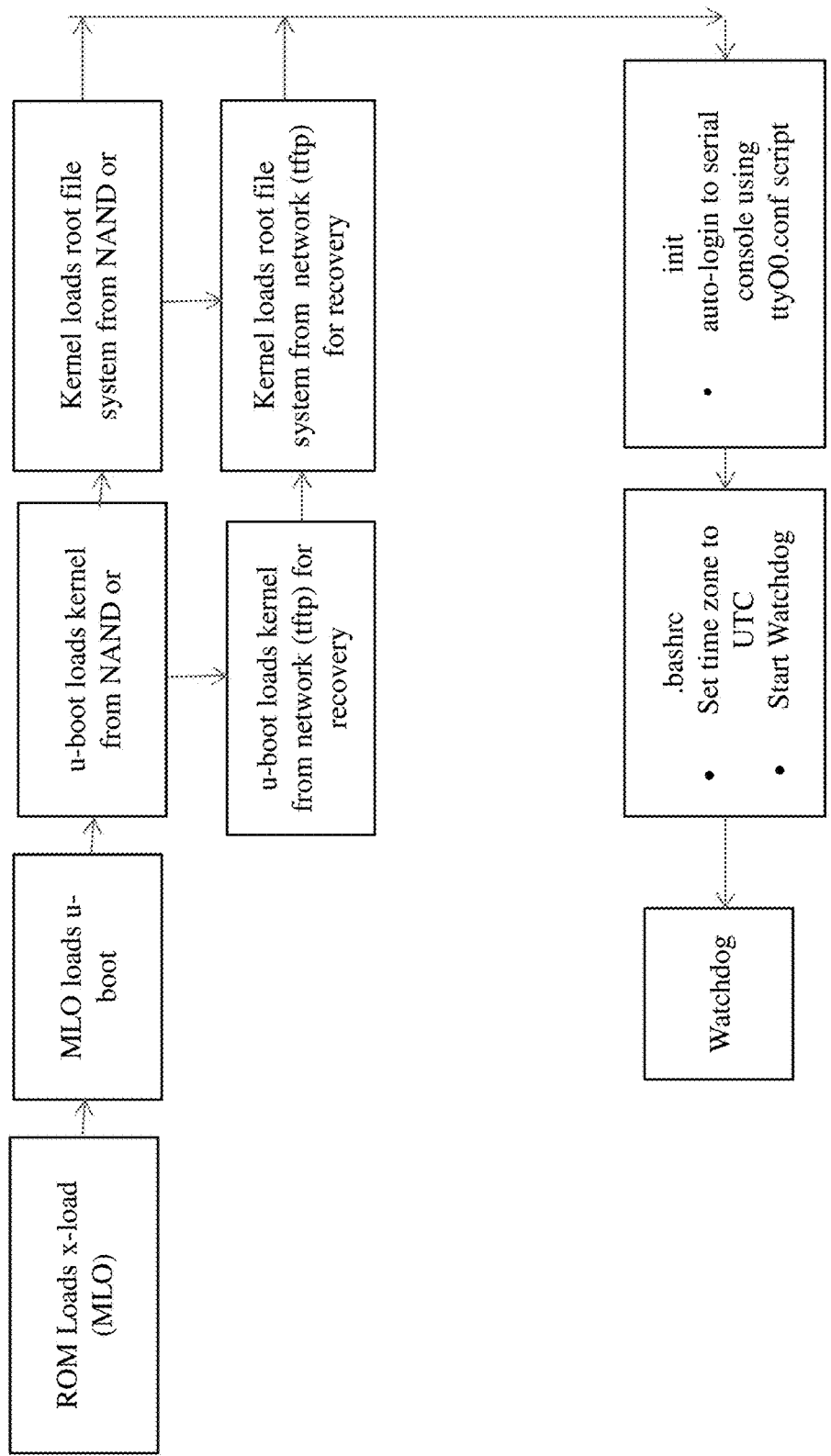
FIG. 4 depicts an illustrative embodiment of a booting process for a probe device that can be used in system 100 of FIG. 1.

In one embodiment, the probe device software can be composed of several separate functions that work together to provide the reliability, test environment, and flexibility to support continuous network operations. For example, the probe device boot up sequence as illustrated in FIG. 4 can include a first stage boot loader (MLO) that is loaded from ROM which in turn loads the second stage boot loader (u-boot). The u-boot can be modified to allow the download of a kernel from NAND ROM on the board or from the network using Trivial File Transfer Protocol (TFTP) in case of failure to load from ROM. During the initialization process, an automatic login can be performed using ttyO0 script. On login, the probe device 150 can execute a .bashrc script that sets the probe device time zone to UTC and starts a watchdog process which can be a parent process. This sequence of boot-up steps can enable the probe device software to auto-start on every soft and/or hard reboot.

In one embodiment, the probe device software can include a watchdog process, which can be, for example, a Linux® process. The probe device 150 can create a probe device agent and a controller child process, such as by using fork and exec routines in Linux. The watchdog process can wait for an exit status of either of these processes using a waitpid process. If any of these processes exits with the status EXITED or SIGNALED, it can recreate the process to ensure that the probe device agent and controller processes are always active.

Figure 5:
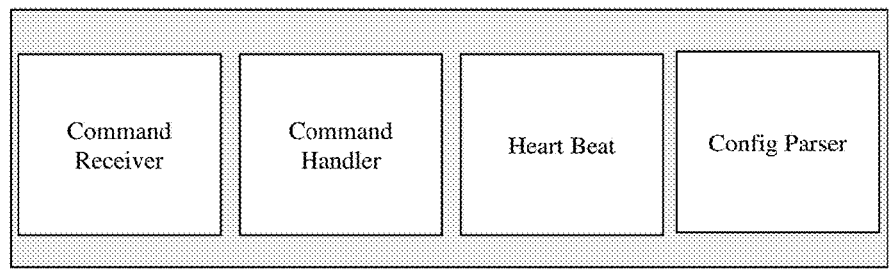
FIG. 5 depicts an illustrative embodiment of a block diagram for a controller for a probe device that can be used in system 100 of FIG. 1.

In one or more embodiments, the probe device 150 has a controller process that can also be a Linux process and can be a supporting process to the probe device agent. The controller process main function is to send the status of the probe device 150 to the database server 195 and to the service server 190, and to listen for new commands from the management portal server 160. The controller process can be comprised of four elements as shown in FIG. 5. The configuration parser can parse the probe device configuration file to read the service server URL and the probe device software FTP URL. The service server URL can be used to send a heart-beat every two minutes to the service server 190. The probe device software can be downloaded from the FTP URL. The probe device 150 can send a heartbeat to the service server 190 at regular intervals (e.g., every two minutes) to indicate to the service server that the probe device is alive and online. The command receiver can be a thread which runs a TCP listener to receive commands from the management portal server 160. The command receiver can acknowledge a command request by sending an ACK response back to the management portal server 160. The command controller can parse the command and can determine whether the command is to be provided to the controller process or to the probe device agent for execution. Various commands can be handled or otherwise processed by the controller (via the command handler), such as software updates including downloading and installing the probe device software; probe device reboot including performing a soft boot of the probe device 150 which assists in recovering from a condition where the probe device software is stuck and has become inactive. In one embodiment, all other commands can be forwarded to the probe device agent.

Figure 6:
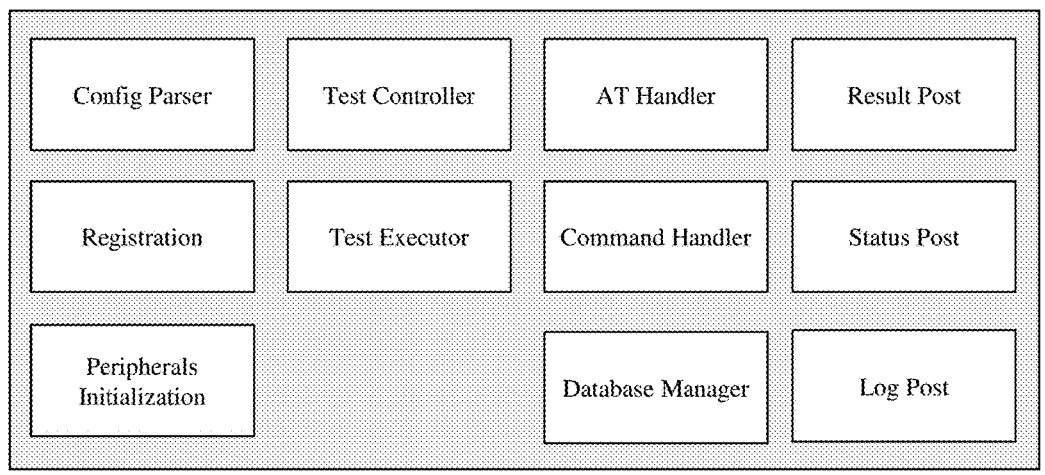
FIG. 6 depicts an illustrative embodiment of a block diagram for a software agent for a probe device that can be used in system 100 of FIG. 1.

The probe device agent can be a Linux process and can be a main process of the probe device software which performs tests to capture and measure wireless network performance. The probe device agent can also be responsible to post the test results to the service server 190. The probe device agent can have a number of components illustrated in FIG. 6. In one embodiment the probe device agent can have a configuration parser that parses the probe device configuration file to read the service server URL, test schedule and test case configuration. The registration component can perform initialization and registration of the probe device 150 to the service server 190. The registration component expects to detect all or at least one of the LTE modem, UMTS modem, WiFi modem or Android handset connected to the probe device hardware. The registration component can read the model, manufacturer, IMEI, ICCID, IMSI, and MSISDN of the LTE and/or UMTS modems. The registration component can read the model, manufacturer, IMSI and/or serial number of the Android handset. The registration component can read the model and manufacturer of the WiFi card. The registration component can also capture the MACID, IP Address, probe device software version, and/or current probe device configuration version of the probe device 150. All this information can be reported in the registration request. The probe device 150 can perform registration even if none of these devices are detected. In one embodiment, if the probe device 150 is running a different configuration version than what is mapped in the management portal server 160, the registration request's response can include a new mapped probe device configuration file. In one embodiment, upon receiving the probe device configuration file, the probe device agent can restart to interface with the new configuration file.

The probe device agent can have a peripheral initialization component that initializes the LTE modem, UMTS modem, WiFi cards and/or Android handsets. All these devices can be connected to the probe device 150 on the USB host port via the multi-port USB hub so communication with all of the internal devices can occur using a USB protocol. The LTE and UMTS modem initialization can include setting up a data session with the network and assigning an IP address to the modem interface on the probe device 150. By setting up a data session at startup, the probe device agent can be always ready to perform data related tests on the network; it does not tear down the data session on every test. The probe device 150 can also initiate a separate thread for each modem to read the response on the AT command interface. WiFi card initialization can include scanning of available WiFi hotspots and establishing connection with the SSID as configured in the probe device configuration file. This can supports WEP, WPA and WPA2 authentication for connection. For accessing a WiFi Services network, the probe device can implement an AAA specification, and can also run a daemon which processes automatic re-connection to a WiFi hotspot in case the connection fails.

In one embodiment, the WiFi, LTE, and UMTS modems can each create one network interface on the probe device 150, and there can always be an Ethernet network interface. In Linux, there may only be one default network interface which is used when any application tries to communicate with another device. To enable simultaneous communication on these interfaces without changing from using the Ethernet as the default interface, the probe device agent can perform IP rule setting for each of these interfaces. In one embodiment, Domain Name Server (DNS) resolution takes place using the Ethernet interface even when using one of the other three interfaces. The Android handset can have two interfaces with the probe device agent. The first interface can be over USB which is used by the probe device agent to communicate with the probe device 150 using ADB (Android Debug Bridge) and the interface is a General Purpose Interface/Output (GPIO) to control the power ON/OFF of the Android handset. During initialization, the probe device agent can use ADB checks if the Android handset is connected. If the probe device agent does not detect the handset, it assumes that it is OFF and can operate GPIO to perform a power cycle on the Android handset. The probe device agent can wait and recheck the connection to the Android handset. Once the connection is established, the probe device agent can start the Android application which can be later instructed to perform some tests. The probe device agent can use the TCP port to establish socket communication with the Android application which can be listening on port 8888.

The probe device agent can have an AT handler that interacts with the modem using AT commands. The AT handler can support sending of AT commands to the modems, and in reading both solicited and unsolicited responses. In one embodiment, there can be a dedicated AT Handler for the UMTS modem and for the LTE modem. The probe device agent can have a test controller that is responsible for controlling and scheduling the test execution. The test controller can create a separate thread for each test execution and can wait for its completion. On completion, the test controller can create a thread for the next test case. Each test case has an associated time period during which it is expected to complete the test. If a test takes more time, it is abruptly terminated and the next test execution begins. The test controller can ensure that the tests are executed per the test schedule established in the probe device configuration file received from the management portal server 160. The probe device configuration file can support various types of scheduling including Microsoft® Outlook scheduling. The test controller can store a sequence ID of the current executing test case and if for any reason the probe device agent experiences a failure, on auto-restart, the probe device 150 can start executing the next test case in the sequence.

The probe device agent can have a test executor that is responsible for test execution. Before commencing the actual test, the network parameters can be captured. After each test execution, the network parameters can again be captured and stored in a local database (e.g., a memory device integrated into the probe device 150 or coupled thereto) along with the test results.

The test executor can perform various tests on a number of communication sessions utilizing various wireless access technologies. The tests can include a voice test, SMS test, MMS test, HTTP download goodput test, HTTP download throughput test, HTTP upload goodput test, HTTP upload throughput test, FTP download test, FTP upload test, PDP context establishment test, ping/latency test, microburst test and/or DNS resolution test.

The probe device agent can have a database manager which can be a SQLite® database application for storing the test results. For example, the database can be created on an SD card. The data can have two parts: test suite related data and test case related data. There can be one or more test cases in one test suite. Data can be stored in JSON encoded format in the database which is in the same format used for posting data to the service and database servers 190, 195. This can assist in avoiding re-encoding of the data while posting a previously failed post to the database server 195. After each successful post to the database server 195, the corresponding data can be deleted from the local database. If the posting of data to the database server 195 fails, the data can be retained in the local database and can be queued to be retried for posting later.

The probe device agent can have a command handler. The probe device agent can process various commands such as via the command handler (e.g., commands received from the management portal server 160): stop probe device service—stops the probe device agent from executing any test and the probe device then goes into IDLE state; start probe device service—starts the probe device agent and places the probe device in an ACTIVE state; start monitor—this command instructs the probe device agent to send the test results after each test execution is completed and this command is sent by the management portal server when a user is viewing the dynamic status of the probe device; stop monitor—this command instructs the probe device agent that the probe device's status is no longer being viewed dynamically so the probe device agent should stop sending the test results at end of each test execution; stream software update—updates the application on the Android handset; stream reboot—reboots the Android handset connected to the probe device; stream start application—starts the application on the Android handset; stream stop application—stops the application on the Android handset; stream power cycle—power cycles the Android handset via the probe device agent initiating a GPIO to power cycle the optional handset; status post—posts the current status of the probe device (Active/Idle) to the database server 195; result post—posts the test results to the database server 195; and/or log post—posts the debug logs to the database server 195 for troubleshooting.

In one embodiment, the probe device 150 can utilize a configuration file, such as in JSON format, that includes a registration URL and port number of the service server 190; test scheduling that allows setting the schedule for testing and which includes options for calendar invites; test case details including details of the test case to be performed by the probe device such as test ID, technology, metadata specific to the test, and/or timeout, and where the test cases can be listed in the order in which they are expected to be executed by the probe device; and/or a maximum size of log file where the probe device can purge the log file once it reaches this size.

In one embodiment, the probe device 150 can utilize a probe device recovery mechanism to address a failure of the probe device, such as in booting up. If the probe device is not able to boot up, it can become inaccessible remotely using Secure Shell (SSH) commands or telnet, and it may not perform testing. In one embodiment, another probe device that is properly functioning can be used to recover the faulty probe device in a same venue. For example, the management portal server 160 can send a command to the properly functioning probe device to change its role which sets an alias IP address such as 192.168.0.1. The management portal server 160 can send a command to the faulty probe device to power cycle. Upon boot up, the faulty probe device can sets its IP address as 192.168.0.2 and can download a kernel and a root file system from the properly functioning probe device at IP address 192.168.0.1 to recover itself.

Referring back to system 100 of FIG. 1, the system provides measurable quality of service statistics through the testing and monitoring of wireless services (e.g., LTE, UMTS, GPS, and WiFi) using the probe devices 150 and the service software described above. The probe devices 150 each execute a series of test scripts (the same scripts or different scripts) that are part of a test suite that tests network services, such as voice, MMS and SMS messaging, location-based services, loading, soft handoff, bandwidth, and other criteria associated with the DAS 120. The probe devices 150 can communicate through routers (not shown) and utilizing a site switch (e.g., SIAD 155), which can transfer the test results data and other network information to the database server 195 to store the test information. In one embodiment, the system 100 can autonomously monitor the database of test data and can evaluate key performance indicators and send alarm to the management portal server 160 and/or to the RAN NOC 180 to alert them to a change in the performance status of the probe devices 150. In one embodiment, the service server 190 can analyze the test data and may determine whether certain threshold(s), associated with key performance indicators that are unique to the network, such as corresponding to a soft handover rate or latency, are being met.

In one embodiment, the system 100 can use a REpresentational State Transfer (REST) RESTful Web service. The communication can be over the secure HTTPS protocol. Data can be exchanged in JavaScript Object Notation (JSON) format. Probe device postings can be in a distributed architecture. Bi-directional communication can be performed with the probe devices 150. Synchronization can be performed of the time used by the probe devices 150 in reporting test activities with the standard server UTC time. Registration of the probe devices can be performed. Updates can be performed for the database 195 with the test results data. Purging of the database 195 can be performed at regular intervals. Notification messages can be sent when a probe device 150 is Offline or Inactive. Notification messages can be provided when any of the servers (e.g., management portal server 160, service server 190 and database server 195) is down or otherwise not functioning properly. Notification messages can be sent if the site switch (e.g., SIAD 155) is down or otherwise functioning improperly. Probe device Ethernet status can be shown or otherwise indicated as Online/Offline and activity status as Active/Idle/Inactive.

In one embodiment, the service server 190 can be a primary interface to the database server 195, which supports the central database with which the other devices and servers (service server 190, management portal server 160, and probe devices 150) interact. In one embodiment, the probe devices 150 can report completion of the test suite to the service server 190 and can post updates to the database server 195 causing the service server 190 to notify the management portal server that the test results information has been updated. In this example, the management portal server 160 can retrieve the new information from the database 195. Continuing with this example, the probe devices 150 may not respond directly to the management portal server commands.

System 100, through use of active monitoring of communication services at the venue, enables adjustments to the coverage of the antenna system of the DAS 120 that can increase performance, such as in certain high usage load areas, thereby increasing call performance and customer satisfaction. Based on the test data collected by the probe devices 150 and stored on the database server 195, when the performance of the DAS 120 reaches a specified threshold, alarms can be issued such as to the network control component in the RAN NOC 180. These alarms, or other notification information resulting from an analysis of the test results of the probe devices 150, can be used to dynamically adjust parameters associated with neighboring macro cell towers and/or the DAS 120 inside the venue to increase performance. These changes or adjustments can include: increasing or decreasing antenna amplification at the macro tower; adding spectrum; changing antenna tilt to provide better coverage; and/or splitting antenna coverage areas to balance the load. In one or more embodiments, the RAN NOC 180 can perform a number of mitigation strategies according to the test results of the probe device 150: remotely changing antenna amplification; adjusting antenna tilt in the affected DAS sector(s); adding antennas in the affected DAS sector(s); and/or bisecting DAS sector(s) into additional DAS sectors to decrease the number of users on each antenna. Other parameters can also be adjusted to improve or otherwise alter system performance according to the test results of the probe devices 150 depending on the particular system and the parameters available to tune system performance.

Figure 8:
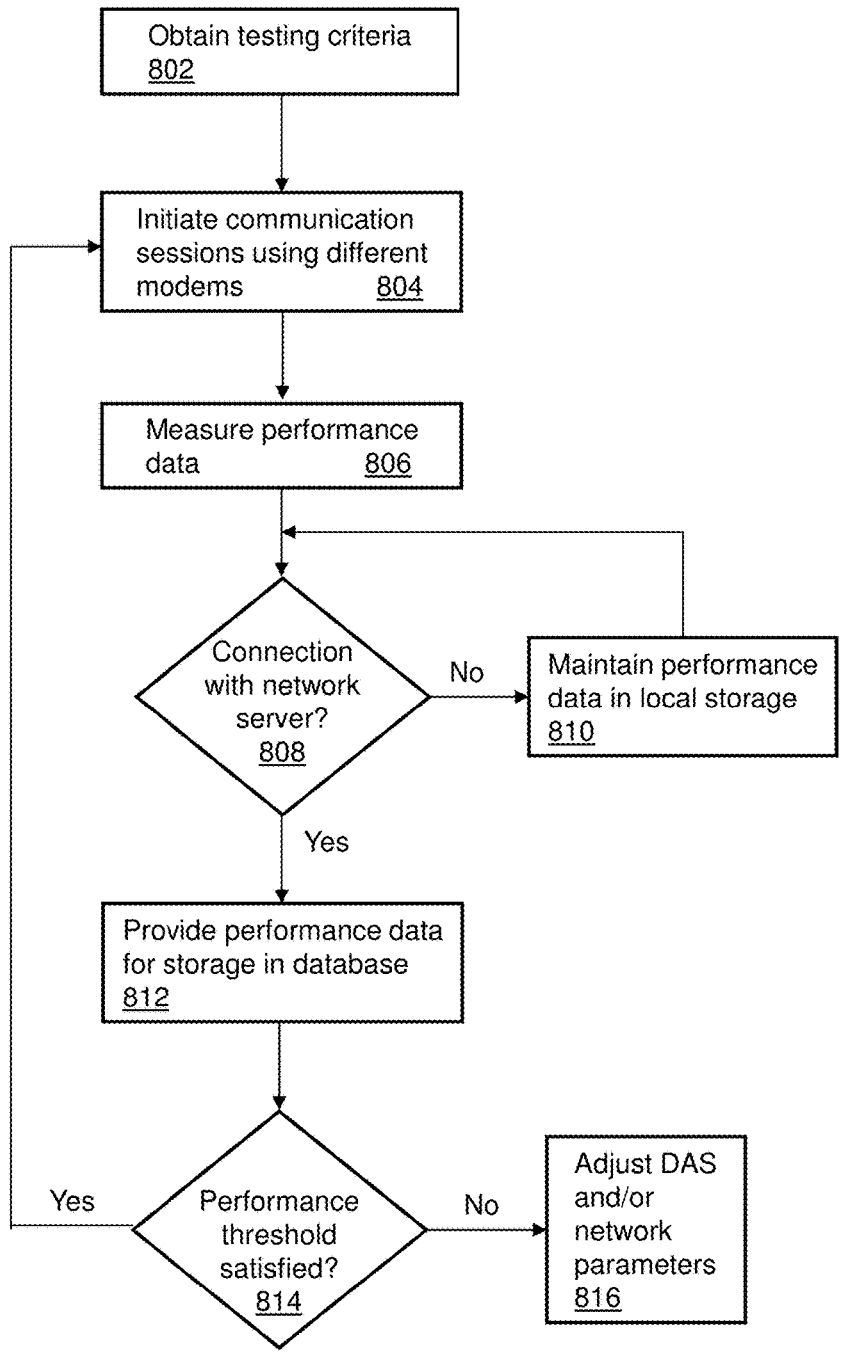
FIG. 8 depicts an illustrative embodiment of a method used in portions of the system described in FIG. 1.

FIG. 8 depicts an illustrative embodiment of a method 800 that can be used by a system (e.g., system 100) for monitoring, analyzing and adjusting communications services, such as at venue 110. Method 800 can commence at 802 where testing criteria is obtained by a group of probe devices 150. The testing criteria can be the same for each of the probe devices 150 or can be different testing criteria depending on a number of factors including the position of the probe device within the venue, the testing capabilities of the probe device, and so forth. The testing criteria can include various information such as the schedule for executing the tests, the type of communication services to be tested, the types of tests to be executed, the types of data to be collected, and so forth. In one embodiment, the testing criteria can be received from the management portal server 160. In another embodiment, the testing criteria can be received from another source, such as another probe device. In one embodiment, the probe devices 150 can communicate with each other to identify testing criteria, such as identifying a schedule for testing. In another embodiment, the probe devices 150 can be in a master-slave arrangement where one (or a subset) of probe devices 150 determine or otherwise generate testing criteria for the remaining probe devices.

At 804, the probe devices 150 can initiate communication sessions according to the testing criteria. The communication sessions can be voice, messaging, video and/or data services utilizing various wireless access technologies including LTE, UMTS, GSM, GPS, WiFi, and so forth. At 806, testing can be performed by the probe devices 150 to obtain performance data. Examples of types of tests that can be performed by the probe devices 150 are illustrated in FIG. 7. In one embodiment, some or all of the initiation of the communication sessions and/or the testing can be performed simultaneously or overlapping in time utilizing the multiple modems integrated into the probe devices 150. In one embodiment, the testing can be done utilizing separate threads for each modem.

At 808, a determination can be made as to whether a connection to a network server (e.g., service server 190 and/or database server 195) exists. For example, each probe device 150 can have a single hardwire interface enabling an Ethernet connection via SIAD 155 to the network server. If the connection does not exist or is otherwise determined to be unavailable for use by the probe device 150, the probe device can locally store the performance data and continue to perform tests on the various communication services at the venue 110. Once the connection with the network server is restored (or if the connection was determined to be available), the performance data (or a portion thereof) can be transmitted at 812 for storage by the database server 195.

The stored performance data can be analyzed at 814 (e.g., by the management portal server 160) to identify the performance of the DAS 120 with respect to each of the communication services over the different wireless access technologies. If the QoS or other performance threshold is satisfactory then method 800 can return to 804 to continue the monitoring and collection of test data by the probe devices 150. If on the other hand, the performance of the DAS 120 is below a QoS threshold or below some other performance threshold then adjustments can be made at 816 to improve or otherwise alter the performance associated with one or more of the communication services over one or more of the wireless access technologies. For example, alarms may be issued to the RAN NOC for dynamically adjusting parameters associated with the neighboring macro cell towers and the DAS antenna system inside the venue to increase performance. As another example, the system 100 can increase or decrease antenna amplification at the macro tower, add spectrum, change antenna tilt to provide better coverage, or split antenna coverage areas to balance the load. Other examples of mitigation actions responsive to detected performance issues include remotely changing antenna amplification, adjusting antenna tilt in the affected DAS sector(s), adding antennas in the affected DAS sector(s), and/or bisecting DAS sector(s) into additional DAS sectors to decrease the number of users on each antenna.

Multiple forms of media services can be offered to end user devices at the venue 110 including voice, video messaging and/or data according to various wireless access protocols such as GSM, Code Division Multiple Access or CDMA, Time Division Multiple Access or TDMA, UMTS, WiMAX, Software Defined Radio or SDR, LTE, WiFi, WiMAX and so on. Other present and next generation wide area wireless access network technologies and/or local area wireless access technologies can be used in one or more embodiments of the subject disclosure.

In one or more embodiments, tracking and validating the correct operation of the hardware and software for each probe device can be performed as the probe device goes through the manufacturing and acceptance test phases before installation in a live venue. For example, a test server system can be utilized as part of the manufacturing and acceptance process for each of the probe devices 150. The test server system can have a blend or portions of the three server (management portal server 160, service server 190 and database server 195) software suites to enable a full range of functional tests on the probe devices as they complete the manufacturing process. The test server system can have similar functionality to the management portal server 160 in order to test the probe devices 150 before they are deployed to the field. The test server system can have the ability to work continuously and can include the ability to auto-start the software once the system boot is complete. The test server system can have the ability to auto recover from a failure condition, and can provide support for various wireless technology testing including WiFi, LTE, UMTS and GSM.

The test server system can track the manufacturer and model of each of the installed radio modules of the probe devices 150, their associated SIM cards and the activation of its' International Mobile Subscriber Identity (IMSI), International Mobile Equipment Identity (IMEI), International Communications Committee Identity (ICCID), and Mobile Subscriber Integrated Services Digital Network Number (MSISDN). The test server system can also perform the functions of the service server 190 of registering and identifying the probe device 150 and recording the ICCID, MSISDN, and SIM card data for each of the modems, wireless account activation for the UMTS modem, LTE modem, and the integrated handset, verifying the correct software version, initializing the test suite and monitoring the test suite completion. The probe device 150 can run the assigned test suite for a specified burn-in period during final manufacturing testing and report the results to the test server system. The service server 190 can store all of the collected test results data on the database portion of the server.

In one embodiment, the test server system can perform some of the functions of the database server 195 to create a database record of the configuration of each new probe device 150 including: ICCID, MSISDN, and SIM card tracking by serial number, MAC address of the processor board, modem model identification and serial numbers, software version number, and test data as the probe device undergoes final testing at the manufacturing site. The test server system can record this information and can send a notification to the management portal software that the database data has been updated and is available for review. At this point, the management portal software can create a new test suite for this probe device 150 or assign an existing test suite for the functional testing of the probe device. The test server system can monitor the software version installed on each probe device 150 to ensure that it is the latest released version. The portal software can control how many times each test of the test suite is run on the probe device 150 and the time period between each different use-case test that is part of the test suite and each iteration of that use-case during acceptance testing. The test suite run on each probe device 150 can consist of multiple use-cases and each can be run multiple times as specified in the portal software. As each probe device 150 completes the manufacturing cycle, the portal can assign a test suite and those test results and the time of completion can be recorded along with the test result data to ensure that all of the major functional pieces of the probe devices are performing as specified for acceptance by a service provider. An example of use-case tests that may be used to build a test suite is shown in FIG. 7. Not all of the available use cases need to be used in each test suite and the test suite contents can depend upon a number of different factors including the modem types installed in the probe device 150.

Active testing at the manufacturing and acceptance test phase for each production probe device 150 can ensure that the highest quality and latest versions of the probe devices are available in the venues 110 to monitor the DAS 120. The use of a test server system enables: remotely manage probe devices; since the portal is web based, any user having proper privileges in the portal and access to the network can access the portal from a PC, tablet, cell phone, or other connected mobile device and is not access platform dependent; able to perform automated testing around the clock to keep the new production probe device's quality standards high; analyze the test results in a graphical manner based on which technology is being monitored; create and edit custom test suites for expanded testing of the probe devices before delivery; download the use-case test suites to the probe devices remotely; update the probe device software remotely; probe device tests can be monitored in near real-time, thus enabling the user to know the current status of the acceptance testing of each probe device and adjust the testing if any weak performing areas are identified during the tests; ability to support testing on at least two radios simultaneously; probe device auto-registration with the service section of the test server system tests the operation of the registration routine, where upon successful boot up the probe device begins reporting test results to the database portion of the server and then reporting the availability of the test results to the portal software when requested by the acceptance test operator. The portal software allows management of the test suite and test scheduling. Remote management of the probe devices 150 is enables including reboot, power cycle, stop service, and start service. The probe device status can be shown as Online or Offline and the state as Active, Idle, or Inactive.

Upon reviewing the aforementioned embodiments, it would be evident to an artisan with ordinary skill in the art that said embodiments can be modified, reduced, or enhanced without departing from the scope of the claims described below. For example, one or more of the components (e.g., the probe device, the management portal server and/or the service server) can be utilized for monitoring, evaluating and adjusting communication services at a venue that does not include a DAS.

Active monitoring of the DAS 120 of the venue 110 allows adjustments to the coverage of the antenna system that can increase performance in certain high load areas thereby increasing communication service performance and customer satisfaction. Remote management of the probe devices 150 through the management portal server 160 can include auto recovery of firmware/software failures so that physical intervention is not required; monitoring test results posted over a reliable Ethernet network; enabling troubleshooting using SSH; scheduling testing hourly, daily, weekly, or monthly; retaining data on the probe device to avoid loss of data in the event that the probe device cannot download the test results to the database server; remotely configurable test execution to be able to change the test suite as conditions change at the venue; auto registration on startup for probe device detection; real time status updates being available on the management portal server by using a start monitoring command; supporting a scalable architecture to support new modem and technology with minimum changes to the software; supporting self-diagnostic testing to discover errors (hardware/assembly) during manufacturing; remotely managing Android handsets through the probe device software; providing technology agnostic monitoring to support future growth in communications technology; a scalable protocol to support additional test parameters without modification to the software interface; supporting and controlling a probe device's ability to switch roles because it can act as a monitor to perform network testing or as a responder to serve as an auto-reply system for multimedia and SMS text messages, or as a mender to use to download the correct software to recover an unresponsive probe device; the ability to support testing on multiple integrated radios simultaneously; the ability to remotely upgrade the probe device software as well as firmware.

In one or more embodiments, the probe device software can continuously run and can include the ability to auto-start once the system boot is complete. The probe device can: auto recover from a failure condition; facilitate configuration; provide support for various access technologies (e.g., WiFi, LTE, UMTS, and GSM); provide an easy means to support new technologies and new communications bands; and provide the ability to communicate over Ethernet and wireless network interfaces simultaneously. The probe device can be remotely configurable from the management portal server, and have the ability to upgrade the software remotely. The portal device can: process commands from the management portal server; register with the management portal server; synchronize the date and time with the management portal server; communicate with an Android handset over ADB (Android debug bridge); power cycle an Android handset using General Purpose Input Output (GPIO) pins; store test results in a local database in case of an error in reporting the test results to the service server or the database server; report the test results to the database server over Ethernet; report various requested or required network parameters including RSSI (received signal strength indication), SINR (Signal to Interference plus Noise Ratio), BER (bit error rate), Reference Signal Received Power (RSRP), Reference Signal Received Quality (RSRQ), band; measure performance of voice call, SMS, MMS, Packet Data Protocol (PDP) Context Establishment, latency, HTTP/FTP upload/download throughput/goodput, DNS resolution time; apply a microburst method of measuring upload and download throughput; and/or apply a speed test method of measuring upload and download throughput.

The collection of test results from the probe devices situated in different areas of the venue allows the RAN operators to identify which parts of the system are suffering degraded performance and enables them to make the appropriate adjustments in that area to resolve the problem without disrupting other technology types or coverage areas.

In one or more embodiments, the probe devices can operate independently and autonomously without centralized control. Various data compilation techniques can be utilized including a tree or hierarchy for test results. The probe device can be physically located in a particular sector of a venue and the probe device can know which sector and which macro cell tower it is associated with. Sector density may be different in different regions of a venue. Sector locations can distinguish areas of a venue, such as seating area from a concession area. The probe devices can be used to monitor traffic in a particular region of the venue depending upon event timing, such as the probe device focused on monitoring seating areas during periods of a game and can focus on concession/lobby areas during intermission before/after game. When making a change to a network, the probe devices may perform more aggressive testing, e.g., to verify a particular change was effective. Such probe device routines can be classified as "special" routines, meaning they would only be implemented during special circumstances, such as a network change. API's can be used to interface with management portal server or other network servers. Data can be collected from other carriers by the probe devices. In a comparative mode, more than one probe device can be implemented within each sector, e.g., two probe device to allow simultaneous testing to be performed—same test case started at the same time. In this example, a comparison between test results can be made to verify accuracy of data.

The exemplary embodiments can be applied to cell towers. Power can be provided on a POTs line, e.g., on a telephone pole. In one or more embodiments, the probe devices do not contain a battery. In other embodiments, a backup power source can be used, such as a battery or a hardwire connection with another power source. The antennas on the probe device can be positioned and spaced apart to enable simultaneous operation (Simop) of different modems. In one embodiment, particular probe devices can be located based on the management portal server remotely turning on the LED indicator of the particular probe device. In one or more embodiments, a venue can have more than one DAS (e.g., a first service provider DAS, a second service provider DAS, and a third party DAS).

In one or more embodiments, the test results collected enable a comparison of services between different service providers at the same venue. In one embodiment, test results can be shared between probe devices so that data verification for accuracy can be performed locally by the probe devices. In one embodiment, other data can be collected as part of the services analysis for the venue, such as network traffic, network resource usage, historical network traffic, historical resource usage, predicted network traffic, and predicted resource usage for the network surrounding or in proximity to the venue. In one or more embodiments, mitigation strategies resulting from an analysis of the test probe performance data can include adjusting network parameters to achieve a compromise in performance of different services at the venue. In one embodiment, an analysis of test results collected from the probe devices can be used for generating testing criteria (e.g., types of tests, types of data to be collected, and/or schedules for the test) to be provided to the same or different probe devices for future testing.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
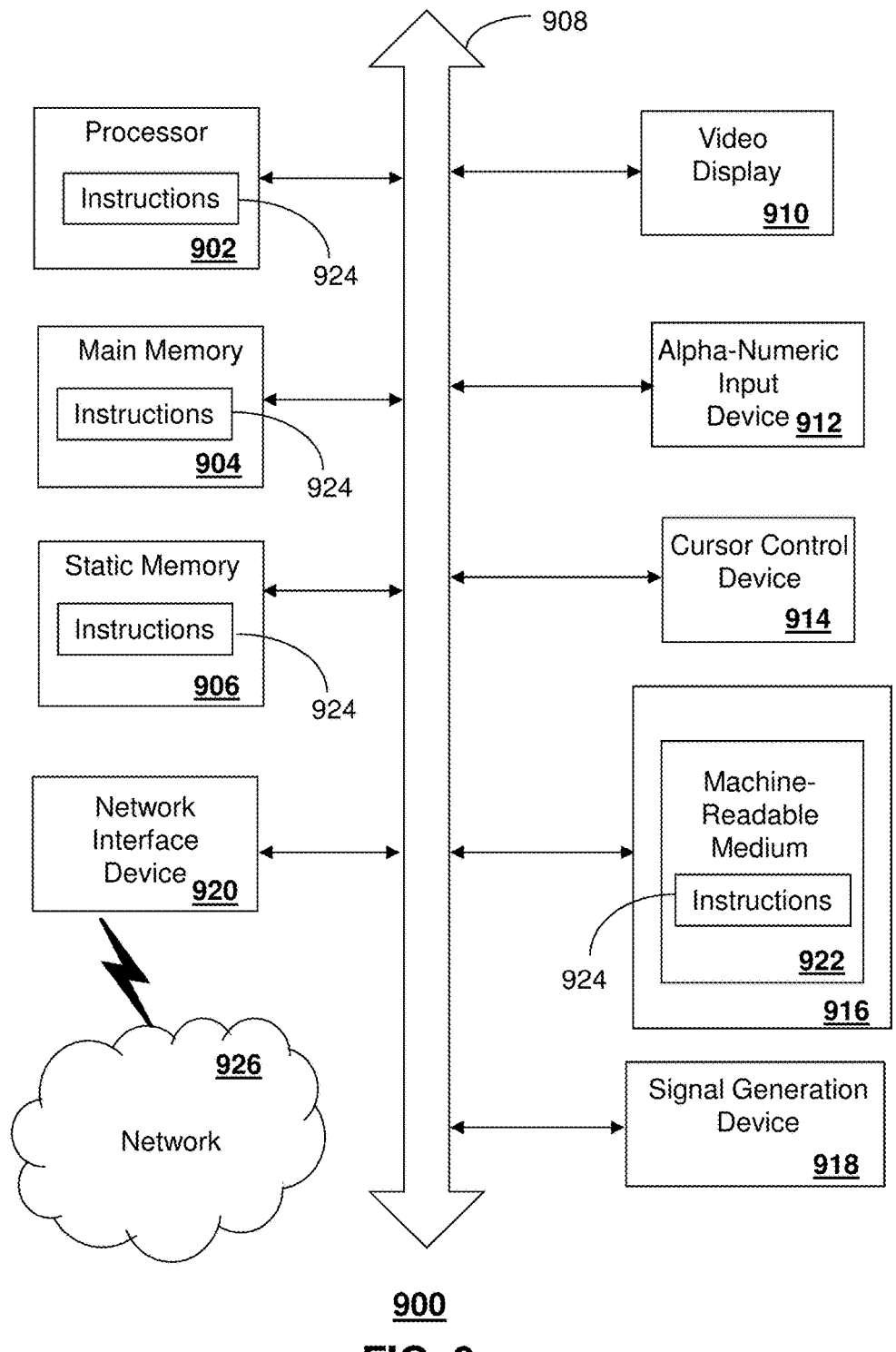
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the probe device 150, the management portal server 160, the service server 190, and/or the database server 195 and other devices described herein In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A probe device, comprising:
a first wireless interface enabling communications via a first wireless access technology;
a second wireless interface enabling communications via a second wireless access technology;
a processor coupled with the first wireless access technology and the second wireless access technology; and
a memory that stores executable instructions that, when executed by the processor, facilitate performance of operations, comprising:
measuring performance data for a first groups of communication sessions and a second groups of communication sessions according to a testing criteria received from a management portal server, wherein the first group of communication sessions is established via the first wireless access technology utilizing a distributed antenna system, and wherein the second group of communication sessions is established via the second wireless access technology utilizing the distributed antenna system;
providing the performance data to a network server to enable an adjustment of the distributed antenna system over one of the first wireless access technology and the second wireless access technology when the performance data indicates one of the first communication sessions or the second communication sessions is below a quality of service threshold;
determining whether a failure of a communications connection with the network server has occurred based on the performance data; and
monitoring for a restoration of the communications connection with the network server responsive to the determining that the failure of the communications connection with the network server has occurred.

2. The probe device of claim 1, wherein the operations further comprise:

storing the performance data in the memory responsive to the determining that the failure of the communications connection with the network server has occurred
wherein the processor comprises a plurality of processors operating in a distributed processing environment.

3. The probe device of claim 2, further comprising:
a single hardwire interface enabling the providing of the performance data to the network server, wherein the probe device receives power via the single hardwire interface, and wherein the operations further comprise:
receiving command signals via the single hardwire interface; and
adjusting operations of the probe device according to the command signals.

4. The probe device of claim 3, wherein the providing of the performance data to the network server enables adjustment of network parameters for a network providing communication services to a first location where the probe device is positioned.

5. The probe device of claim 1, wherein the operations further comprise:
receiving an upgrade command from the management portal server; and
adjusting the executable instructions according to the upgrade command to generate adjusted executable instructions, wherein the adjusted executable instructions, when executed by the processor, facilitate performance of adjusted operations, comprising:
initiating a third group of communication sessions via the first wireless access technology utilizing the distributed antenna system;
measuring adjusted performance data for the third group of communication sessions; and
providing the adjusted performance data to the network server to enable an adjustment of the distributed antenna system, an adjustment of a network providing communication services to a first location where the probe device is positioned, or a combination thereof.

6. The probe device of claim 5, wherein the adjusted executable instructions, when executed by the processor, facilitate performance of adjusted operations, comprising:
initiating a fourth group of communication sessions, the fourth group of communication sessions via the second wireless access technology utilizing the distributed antenna system;
measuring adjusted performance data for the fourth group of communication sessions; and
providing the adjusted performance data to the network server to enable an adjustment of the distributed antenna system, an adjustment of a network providing communication services to a first location where the probe device is positioned, or a combination thereof.

7. The probe device of claim 1, wherein the measuring of the performance data for the first and second groups of communication sessions comprises establishing a separate thread for each of the first wireless interface and the second wireless interface.

8. The probe device of claim 1, wherein the operations further comprise:
receiving a power cycle reconfiguration command from the management portal server;
cycling power and rebooting the probe device; and
downloading a kernel and root file system.

9. The probe device of claim 8, wherein the operations further comprise adjusting an Internet Protocol address associated with the probe device responsive to the power cycle reconfiguration command.

10. The probe device of claim 9, wherein the rebooting is performed with the Internet Protocol address, and wherein the downloading is from a second probe device.

11. A method comprising:
providing, by a processing system including a processor, test scripts to a plurality of probe devices;
receiving, by the processing system, performance data from a first probe device of the plurality of probe devices collected during a first group of data communication sessions and a second group of data communication sessions, the performance data being measured according to testing criteria set forth in the test scripts, wherein the first probe device executes test scripts to initiate the first and second groups of data communication sessions, wherein the first group of communication sessions is established via a first wireless access technology utilizing a distributed antenna system, wherein the second group of communication sessions is established via a second wireless access technology utilizing the distributed antenna system, wherein the first probe device determines whether a failure of a communications connection with the processing system has occurred based on the performance data, and wherein the first probe device monitoring for a restoration of the communications connection with the processing system responsive to the determining that the failure of the communications connection has occurred;
analyzing, by the processing system, the performance data; and
adjusting, by the processing system, the distributed antenna system, a network providing communication services to a location where the first probe device is positioned, or a combination thereof, wherein the adjusting is based on the analyzing of the performance data.

12. The method of claim 11, wherein the first and second groups of data communication sessions includes a data upload test, a data download test, or a combination thereof, and wherein the processing system includes a testing server that monitors an activation of radio module identifications of the first probe device.

13. The method of claim 12, wherein the data upload test comprises measuring a time to upload an image to the Internet, measuring an ftp upload throughput, measuring an http upload throughput, measuring a domain name server resolution time, measuring latency, or a combination thereof.

14. The method of claim 12, wherein the data download test comprises measuring an http download throughput, an http download throughput, an ftp download throughput, measuring a domain name server resolution time, measuring latency, or a combination thereof.

15. The method of claim 11, wherein a portion of the first and second groups of data communication sessions overlap in time, and wherein the testing criteria includes a testing schedule and an identification of tests to be performed by the probe device to obtain the performance data.

16. The method of claim 11, further comprising:
sending, by the processing system, a power cycle reconfiguration command to the plurality of probe devices, wherein the plurality of probe devices perform a power cycle and reboot responsive to the power cycle reconfiguration command; and
providing, by the processing system, a kernel and root file system for downloading by the plurality of probe devices.

17. A machine-readable storage medium, comprising executable instructions that, when executed by a processor of a probe device, facilitate performance of operations, comprising:
measuring first performance data, by a first wireless interface of the probe device, of a first group of data communication sessions according to testing criteria, the first group of data communication sessions being established via a first wireless access technology utilizing a distributed antenna system;
measuring second performance data, by a second wireless interface of the probe device, of a second group of data communication sessions according to the testing criteria, the second group of data communication sessions being established via a second wireless access technology utilizing the distributed antenna system;
determining whether a failure of a communications connection with a management portal server has occurred based on the first performance data and the second performance data;
monitoring for a restoration of the communications connection with the management portal server responsive to the determining that the failure of the communications connection with the management portal server has occurred;
establishing a first thread for the first wireless interface and a second thread for the second wireless interface;
receiving commands from the management portal server during execution of the first thread and the second thread; and
performing a command received during execution of the first thread and the second thread.

18. The machine-readable storage medium of claim 17, wherein performing the command comprises:
sending the performance data to the management portal server,
stopping an execution of one of the first or second threads,
restarting execution of the first or second threads,
rebooting a communication device connected to the probe device,
starting an application on the communication device,
power cycling the communication device,
posting a current status of the probe device,
posting test results to a database server, or
a combination thereof, and
wherein the processor comprises a plurality of processors operating in a distributed processing environment.

19. The machine-readable storage medium of claim 17, further comprising:
receiving a power cycle reconfiguration command from the management portal server;
performing a power cycle and reboot responsive to power cycle reconfiguration command; and
downloading a kernel and root file system from the management portal server.

20. The machine-readable storage medium of claim 17, further comprising responsive to receiving an upgrade command from the management portal server:
initiating a third group of communication sessions via a third wireless access technology utilizing the distributed antenna system;
measuring adjusted performance data for the third group of communication sessions; and providing the adjusted performance data to a network server to enable adjustment of the distributed antenna system, adjustment of a network providing communication services to a first location where the probe device is positioned, or a combination thereof.

* * * * *